O. TAYLOR.
Car-Couplings.
No. 143,646. Patented Oct. 14, 1873.
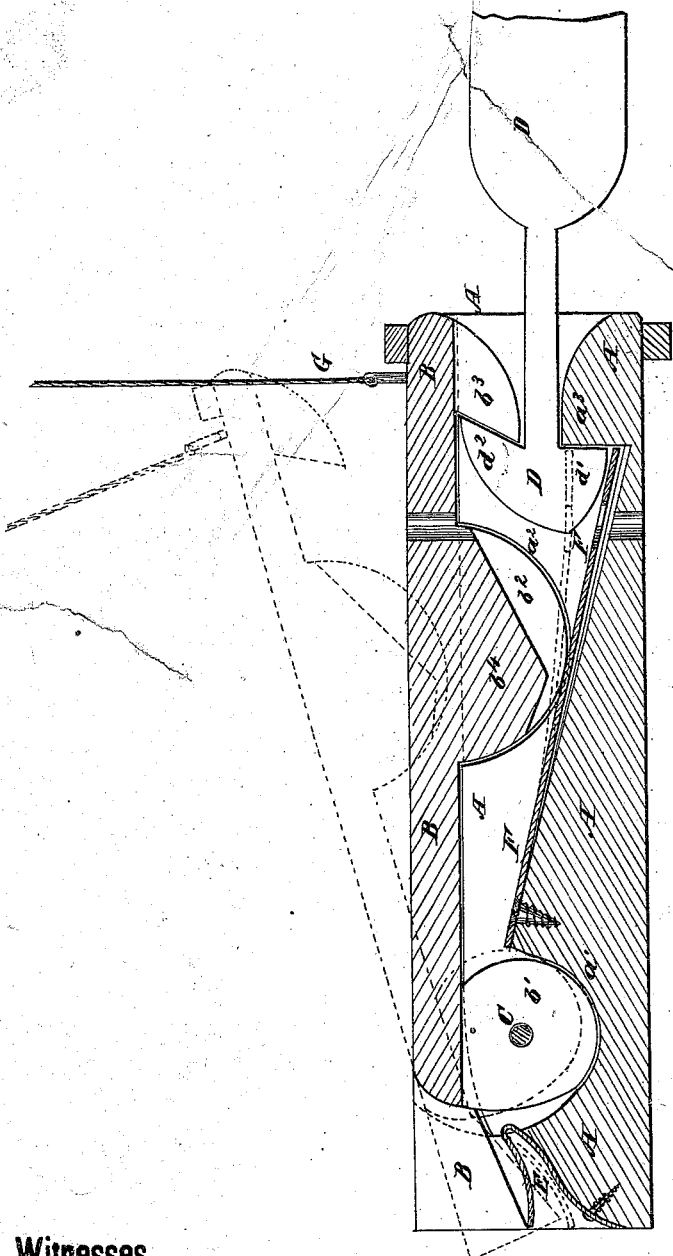
Witnesses:
Inventor:
O. Taylor
Per
Attorneys.

UNITED STATES PATENT OFFICE.

OSCAR TAYLOR, OF GRAND RAPIDS, WISCONSIN.

IMPROVEMENT IN CAR-COUPLINGS.

Specification forming part of Letters Patent No. 143,646, dated October 14, 1873; application filed June 28, 1873.

*To all whom it may concern:*

Be it known that I, OSCAR TAYLOR, of Grand Rapids, in the county of Wood and State of Wisconsin, have invented a new and useful Improvement in Automatic Car-Coupling, of which the following is a specification:

The figure is a vertical longitudinal section of my improved car-coupling.

The invention will first be fully described, and then pointed out in the claim.

A B represent the bumper-head, which is made in two parts. The lower or main part A is recessed longitudinally. Upon the lower side of the upper part, near its rear end, is formed a rounded projection, $b^1$, which fits into a corresponding recess, $a^1$, in the body of the lower part A. The two parts A B are pivoted to each other by a pin, C, which passes through the sides of the part A, and through the projection $b^1$ of the part B. Upon the lower side edges of the forward part of the part B are formed semicircular projections $b^2$, which fit into semicircular recesses $a^2$, formed in the upper edges of the sides of the part A. The draft-strain upon the upper part B is thus sustained by the three projections $b^1$ $b^2$ $b^3$. The cavity of the lower part A inclines downward as it passes forward, so as to form a square shoulder, $a^3$, for the square shoulder $d^1$ of the coupling-bar D to rest against in sustaining the draft-strain. Upon the lower side of the forward end of the part B is formed a hooked or inclined shoulder, $b^3$, for the hooked or inclined shoulder $d^2$ of the coupling-bar D to rest against in sustaining the draft-strain. Upon the lower side of the middle part of the part B is formed a projection, $b^4$, to serve as a stop to prevent the coupling-bar D from being pushed too far in. The part B is held down to its place by a spring, E, placed beneath its rear end in a recess in the part A. To the inclined inner surface of the part A is attached a spring, F, which is held down against said inclined surface by the projections of the part B, and which, when said part B is raised in uncoupling the cars, raises the shoulder $d^1$ of the coupling-bar D from the square shoulder $a^3$ of the part A, allowing the said coupling-bar to be withdrawn. The part B is raised to uncouple the cars by a cord or chain, G, attached to its forward end, and which leads up to the platform or top of the car, or to both places. The ends of the coupling-bar D are inclined or beveled off, so that as the cars are run together it may raise the forward end of the part B and pass the shoulders $a^3$ $b^3$. Through the forward parts of the spring F and the parts A B is formed a hole to receive a pin, so that a car provided with my improved coupling may be coupled with a car provided with the ordinary link-and-pin coupling.

Having thus described my invention, I claim as new and desire to secure by Letters Patent—

The combination of the part A, provided with the recesses $a^1$ $a^2$ and square shoulder $a^3$, the part B, provided with the projections $b^1$ $b^2$ $b^4$ and the inclined or hooked shoulder $b^3$, and the springs E and F, substantially as herein shown and described.

OSCAR TAYLOR.

Witnesses:
MATTHEW CURRAN,
HENRY J. STOCKING.